(12) United States Patent
Zhu (10) Patent No.: US 11,120,180 B2
(45) Date of Patent: Sep. 14, 2021

(54) METHODS AND SYSTEMS FOR CONDUCTING A TIME-MARCHING NUMERICAL SIMULATION OF A DEEP DRAWING METAL FORMING PROCESS FOR MANUFACTURING A PRODUCT OR PART

(71) Applicant: Livermore Software Technology Corporation, Livermore, CA (US)

(72) Inventor: Xinhai Zhu, Pleasanton, CA (US)

( * ) Notice: Subject to any disclaimer, the term of this patent is extended or adjusted under 35 U.S.C. 154(b) by 373 days.

(21) Appl. No.: 16/174,729

(22) Filed: Oct. 30, 2018

(65) Prior Publication Data
US 2019/0065646 A1   Feb. 28, 2019

Related U.S. Application Data

(63) Continuation-in-part of application No. 16/169,802, filed on Oct. 24, 2018, and a continuation-in-part of
(Continued)

(51) Int. Cl.
*G06F 30/23* (2020.01)
*G06F 30/17* (2020.01)
(Continued)

(52) U.S. Cl.
CPC .............. *G06F 30/23* (2020.01); *G06F 30/17* (2020.01); *G06F 2111/10* (2020.01); *G06F 2113/24* (2020.01)

(58) Field of Classification Search
CPC .. G06F 2113/24; G06F 2111/10; G06F 30/23; G06F 30/17
(Continued)

(56) References Cited

U.S. PATENT DOCUMENTS

| 5,379,227 A * | 1/1995 | Tang ...................... B21D 22/26 |
| | | 700/98 |
| 7,870,792 B2 * | 1/2011 | Kubli ...................... G06F 30/15 |
| | | 73/826 |

(Continued)

OTHER PUBLICATIONS

Hora et al. "A generalized approach for the prediction of necking and rupture phenomena in the sheet metal forming", Jan. 2012, *Institute of Virtual Manufacturing, ETH Zurich*.

(Continued)

*Primary Examiner* — Thai Q Phan (57) ABSTRACT

A FEA model representing a product/part with certain finite elements for metal portion, metal fracture failure criteria, a measurement characteristic length in a specimen test, and characteristics of a neck formed in the metal are received in a computer system. The metal fracture failure criteria contain respective measured critical strain value and average fracture strain value in various loading conditions. The characteristics of the neck include the neck's width and a profile of strain distribution within the neck's width. Respective peak fracture strain values are calculated for various loading conditions using a formula based on the profile of strain distribution, the neck's width, and measured critical strain value and average fracture strain value. Peak fracture strain values are used in each solution cycle of a time-marching simulation of a deep drawing metal forming process for manufacturing the product/part.

20 Claims, 7 Drawing Sheets

Related U.S. Application Data application No. 15/157,301, filed on May 17, 2016, now abandoned, said application No. 16/169,802 is a continuation-in-part of application No. 14/861,976, filed on Sep. 22, 2015, now abandoned.

(51) Int. Cl.
*G06F 111/10* (2020.01)
*G06F 113/24* (2020.01)

(58) Field of Classification Search
USPC .................................. 703/2, 5, 9
See application file for complete search history.

(56) References Cited

U.S. PATENT DOCUMENTS

| | | | |
|---|---|---|---|
| 8,511,178 B2 * | 8/2013 | Golovashchenko | G01N 3/20 73/849 |
| 9,522,419 B2 * | 12/2016 | Golovashchenko | B21D 37/08 |
| 10,977,399 B2 * | 4/2021 | Zhu | G06F 30/23 |
| 2009/0272171 A1 * | 11/2009 | Golovashchenko | G06F 30/23 72/348 |
| 2011/0179846 A1 * | 7/2011 | Golovashchenko | B21D 37/08 72/347 |
| 2011/0295570 A1 * | 12/2011 | Zhu | G06F 30/23 703/2 |
| 2017/0140081 A1 * | 5/2017 | Suzuki | B21D 37/20 |

OTHER PUBLICATIONS

USPTO Office Action for U.S. Appl. No. 14/705,295 dated Sep. 12, 2017.

USPTO Notice of Allowance for U.S. Appl. No. 14/705,295 dated Jan. 17, 2018.

USPTO Office Action for U.S. Appl. No. 14/861,976 dated Aug. 8, 2018.

USPTO Office Action for U.S. Appl. No. 15/157,301 dated Oct. 4, 2018.

* cited by examiner

100

102

Receive, in a computer system having a FEA application module installed thereon, a FEA model representing a product/part made at least in-part of metal, a set of metal necking failure criteria in form of a loading path diagram that include measured critical strain value and average fracture strain value obtained in a physical or numerically-simulated specimen test, measurement characteristic length used in the specimen test and a neck's characteristics (the neck's width and a profile of strain distribution within the neck), the FEA model contains at least certain finite elements representing the metal portion

104

Obtain, with the FEA application module, numerically-calculated structural behaviors by conducting a time-marching simulation of a deep drawing metal forming process for manufacturing the product/part using the FEA model in a number of solution cycles, at each solution cycle, calculating respective peak fracture strain values for various loading conditions using a formula based on the profile of strain distribution and measured data at each integration point of each of the finite elements

METHODS AND SYSTEMS FOR CONDUCTING A TIME-MARCHING NUMERICAL SIMULATION OF A DEEP DRAWING METAL FORMING PROCESS FOR MANUFACTURING A PRODUCT OR PART

CROSS-REFERENCE TO RELATED APPLICATIONS

This application is a continuation-in-part (CIP) of U.S. patent application Ser. No. 16/169,802 for "Methods And Systems For Conducting A Time-Marching Numerical Simulation Of A Deep Drawing Metal Forming Process For Manufacturing A Product or Part", filed Oct. 24, 2018, which is a CIP of co-pending U.S. patent application Ser. No. 14/861,976 for "Methods And Systems For Conducting A Time-Marching Numerical Simulation Of A Structure Expected To Experience Metal Necking Failure", filed on Sep. 22, 2015.

This application is also a CIP of U.S. patent application Ser. No. 15/157,301 for "Systems And Methods Of Deriving Peak Fracture Strain Values Of Metal Experiencing Fracture Failure", filed May 17, 2016.

FIELD

The patent document relates generally to computer-aided engineering analysis. More particularly, the present document relates to methods and systems for conducting a time-marching numerical simulation of a deep drawing metal forming process for manufacturing a product or part.

BACKGROUND

Computer aided engineering (CAE) has been used for supporting engineers in many tasks. For example, in a structure or engineering product design procedure, CAE analysis, particularly finite element analysis (FEA), has often been employed to predict structural behavior (e.g., stresses, displacements, etc.) under various simulated loading conditions (e.g., static or dynamic).

An example of using FEA is sheet metal forming, which has been used in the industry for years for creating metal parts from a blank sheet metal, for example, automobile manufacturers and their suppliers produce many parts using sheet metal forming.

One of the most used sheet metal forming processes is deep drawing, which involves a hydraulic or mechanical press pushing a specially-shaped punch into a matching die with a piece of blank sheet metal in between. Exemplary products made from this process include, but are not limited to, car hood, fender, door, automotive fuel tank, kitchen sink, aluminum can, etc. In some areas of the die, the depth of a part or product being made is generally more than half its diameter. As a result, the blank is stretched and therefore thinned in various locations due to the geometry of the part or product. The part or product is only good when there is no structural defect such as material failure (e.g., cracking, tearing, wrinkling, necking, etc.).

In order to numerically simulate metal necking and fracture failure in finite element analysis, metal failure criteria are specified by users. Prior art approaches have been developed from metal specimen test (either physical or numerically-simulated). Before the metal develops a neck, the strain is homogeneous throughout the specimen; therefore the measured strain values including the critical (necking) strain value are constant. The critical necking strain value is the highest strain value before necking starts. From thereon, the strain becomes non-uniform and concentrates within the neck. As a result, the measured fracture strain value is an average value over a measurement characteristic length (i.e., strain gauge or a finite element representing the strain gauge). Due to the measurement dependency of the average fracture strain values, these prior art approaches often cause confusions and difficulties for preparing input data and lead to incorrect simulation because users need to prepare the failure criteria based on these artificial and ad hoc requirement.

BRIEF SUMMARY

This section is for the purpose of summarizing some aspects of the invention and to briefly introduce some preferred embodiments. Simplifications or omissions may be made to avoid obscuring the purpose of the section. Such simplifications or omissions are not intended to limit the scope of the invention.

Methods and systems for conducting a time-marching numerical simulation of a deep drawing metal forming process for manufacturing a product/part are disclosed. According to one aspect, a finite element analysis (FEA) model representing a product or part made at least in-part of metal, metal fracture failure criteria in forms of a loading path diagram, a measurement characteristic length in a specimen test, and characteristics of a neck formed in the metal are received in a computer system. The metal fracture failure criteria contain respective measured critical strain value and average fracture strain value in various loading conditions between uni-tension and bi-axial tension. The characteristics of the neck including the neck's width and a profile of strain distribution within the neck's width. Respective peak fracture strain values are calculated for various loading conditions using a formula based on the profile of strain distribution, the neck's width, the measured critical strain value and the average fracture strain value. The average fracture strain is based on the measurement characteristic length. Peak fracture strain values are used in each solution cycle of a time-marching numerical simulation of a deep drawing metal forming process for manufacturing the product/part using the FEA model. Numerically-calculated structural behaviors of the product/part are used for physical manufacturing of the product/part.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1-8. However, those skilled in the art will readily appreciate that the detailed description given herein with respect to these figures is for explanatory purposes as the invention extends beyond these limited embodiments.

Figure 1:
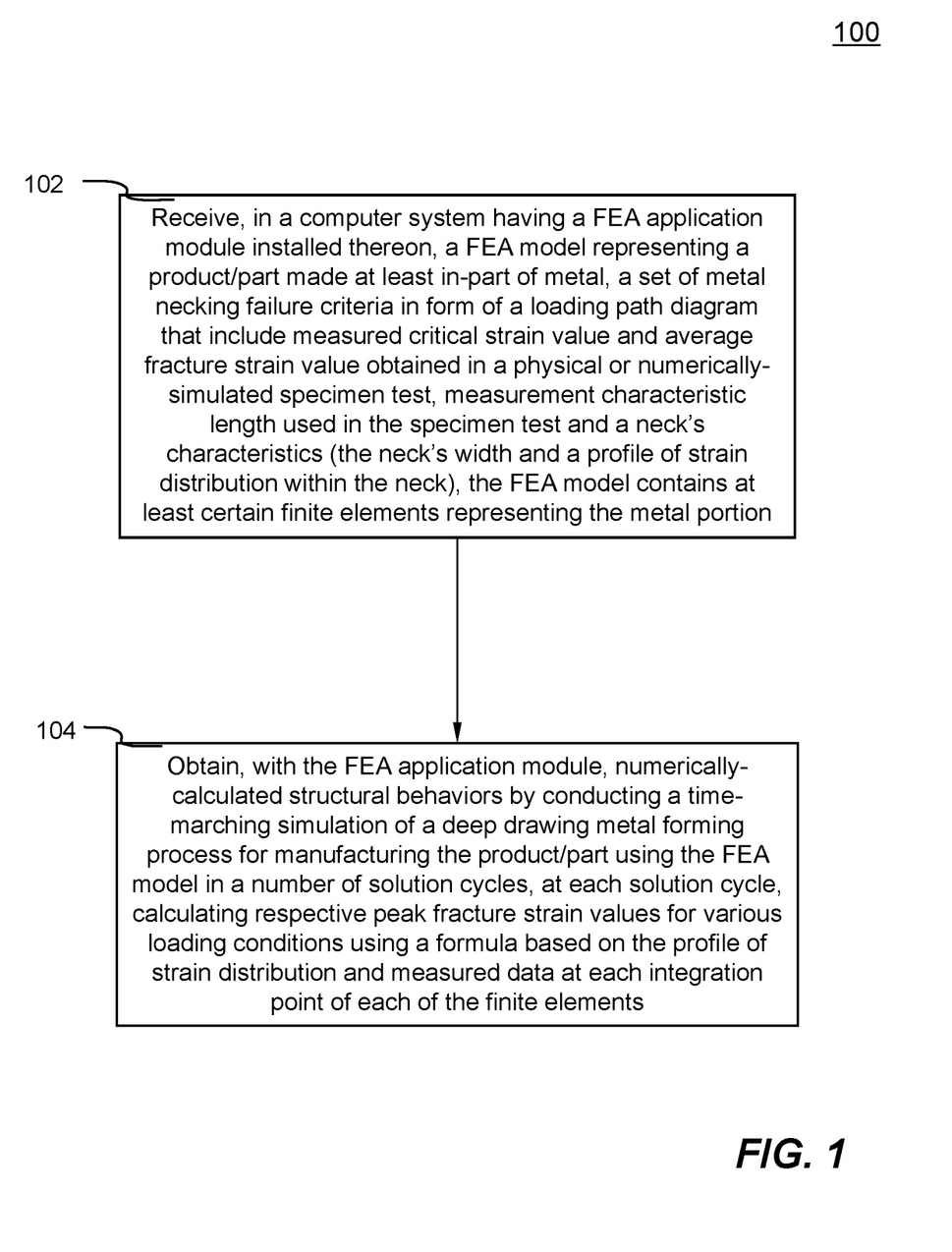
FIG. 1 is a flowchart illustrating an example process of conducting a time-marching numerical simulation of a deep drawing metal forming process for manufacturing a product or part, according to an embodiment of the invention.

Referring first to FIG. 1, it is a flowchart illustrating an example process 100 of conducting a time-marching numerical simulation of a deep drawing metal forming process for manufacturing a product or part. Process 100 is preferably implemented in software and understood with other figures.

Process 100 starts at action 102 by receiving a FEA model representing a product or part made at least in-part of metal, a set of metal necking failure criteria in form of a loading path diagram, measurement characteristic length used in the specimen test and a neck's characteristics (the neck's width and a profile of strain distribution within the neck) in a computer system (e.g., computer system 800 of FIG. 8) having a FEA application module installed thereon.

The FEA model contains at least certain finite elements for representing the metal portion of the product/part. The loading path diagram (e.g., loading path diagram 300 in FIG. 3) contains respective measured critical strain value and average fracture strain value in various loading conditions or strain directions obtained in a physical or numerically-simulated specimen test. In one embodiment, the loading conditions range over uni-tension and bi-axial tension.

The measurement characteristic length used in the specimen test and the neck's characteristics are also received in the computer system. The characteristic length used in a physical specimen test is the original length of a strain gauge used for measurement. The characteristic length in a numerically-simulated specimen test is the dimension of the finite element used for numerically representing the strain gauge. The neck's characteristics include the neck's width and a profile of the strain distribution within the neck. (e.g., see FIGS. 5-6).

Figure 2:
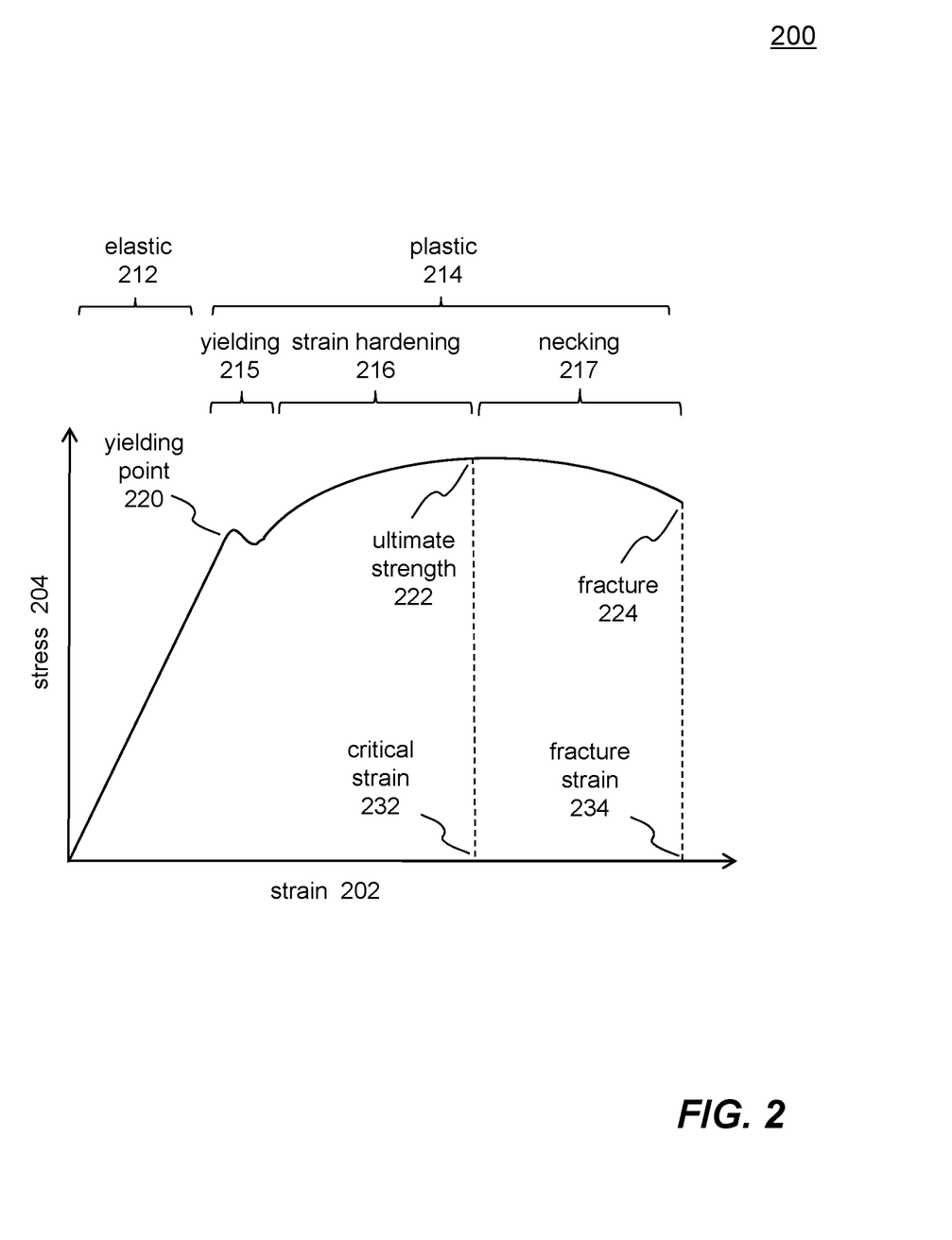
FIG. 2 is a diagram showing a stress-strain relationship of an example metal, according to an embodiment of the invention.

FIG. 2 shows an example stress-strain curve 200, which may be used for determining post-yielding structural behaviors including necking and fracture, according to one embodiment of the invention. The curve 200 has a vertical axis representing stress 204 and a horizontal axis for strain 202. Material has two regions: elastic 212 and plastic 214. Plastic region 214 is further divided into three categories: yielding 215, strain hardening 216 and necking 217. At the top end of the elastic region of the stress-strain curve 200 is a yielding point 220, to which the yielding stress corresponds. The critical strain 232 corresponds to the ultimate strength point 222 (i.e., onset of necking 217) and the fracture strain 234 corresponds to the fracture location 224.

Figure 3:
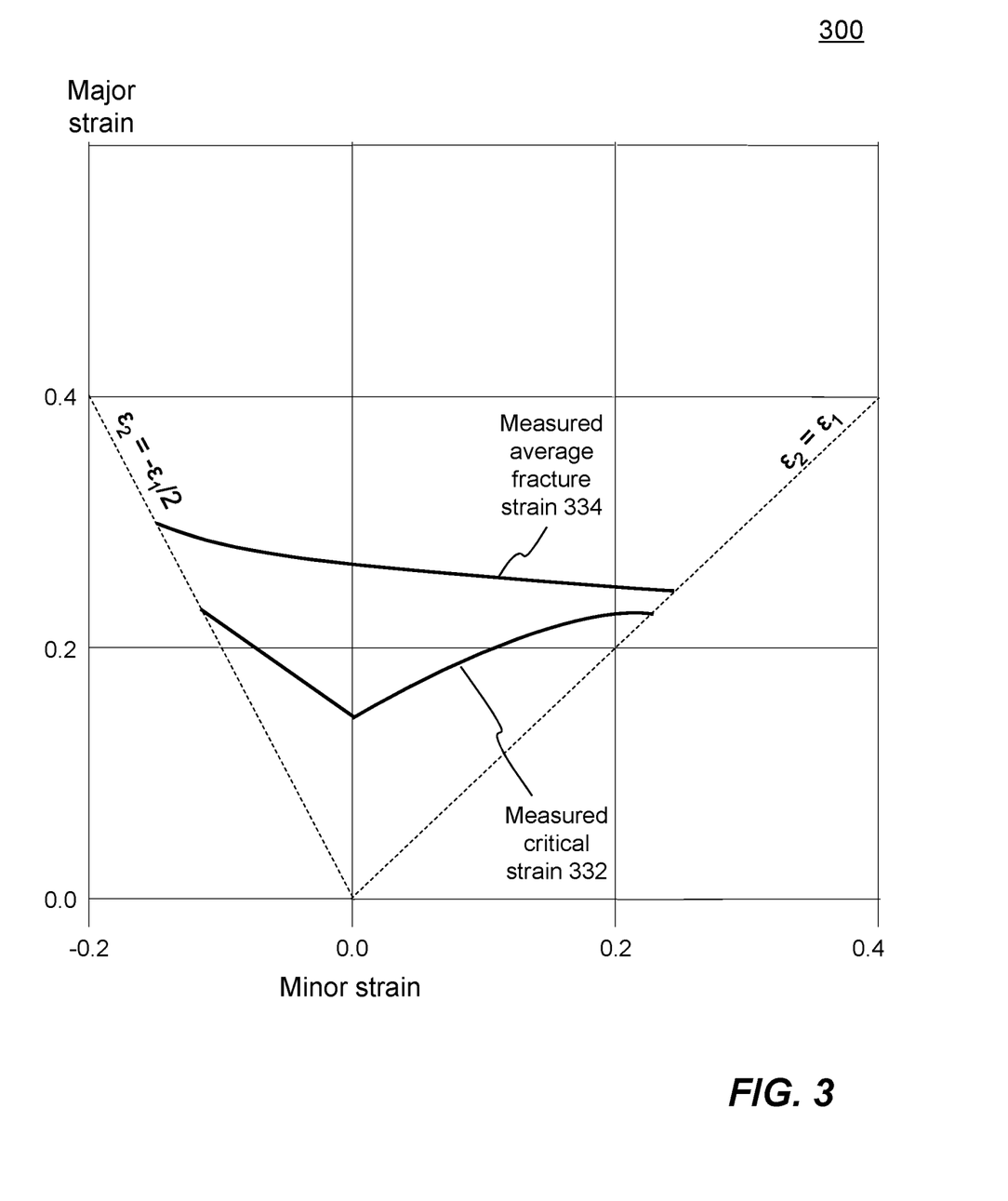
FIG. 3 shows an example loading path diagram containing measured critical strain value and average fracture strain value obtained in a physical or numerically-simulated specimen test of a metal of interest in accordance with an embodiment of the invention.

FIG. 3 shows an example set of metal fracture failure criteria in forms of a loading path diagram 300, according to an embodiment of the invention. The loading path diagram 300 has two axes: a vertical axis representing strain values in major strain ($\varepsilon_1$) direction and a horizontal axis representing strain values in minor strain ($\varepsilon_2$) direction. The metal fracture failure criteria contain respective measured critical strain values 332 and measured average fracture strain values 334 in various loading conditions or strain directions obtained in a physical or numerically-simulated specimen test. In physical specimen test, a strain gauge is used for measuring the data. In numerically-simulated specimen test, finite element analysis can be used for predicting the data. For example, a bi-axial tension loading is illustrated as a dotted line marked by ($\varepsilon_2=\varepsilon_1$). A uni-tension loading is shown as a dotted line marked by ($\varepsilon_2=-\varepsilon_1/2$).

Figure 4:
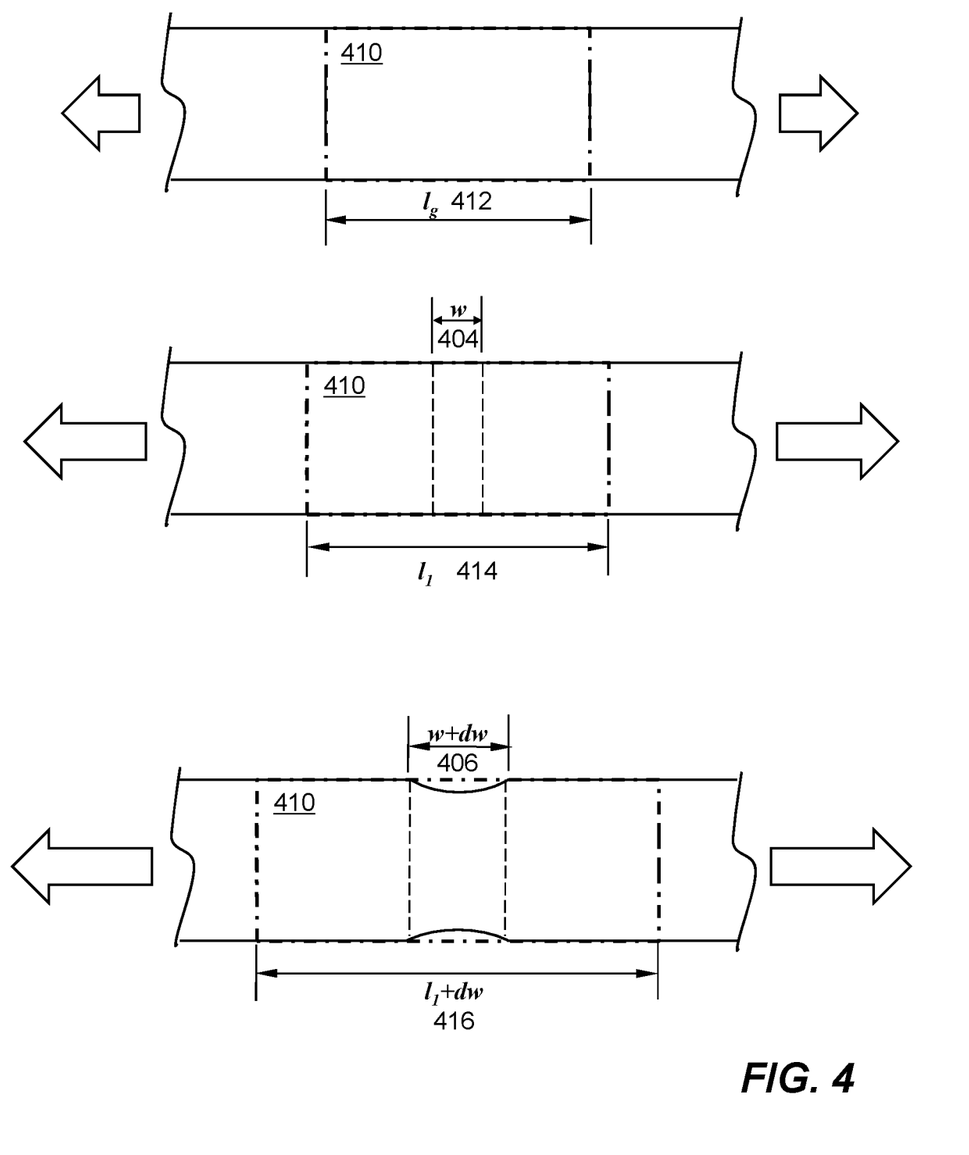
FIG. 4 is a set of schematic diagrams showing various stages of an example physical or numerically-simulated specimen test, according to an embodiment of the invention.

FIG. 4 is a set of schematic diagrams showing various stages of an example physical or numerically-simulated specimen test of a metal of interest in accordance with one embodiment of the invention. For the purpose of the invention, the larger positive strain (i.e., stretch by tension) of the two computed strain values is referred to as a major strain. The other is referred to as the minor strain, which can be positive (under tension) or negative (under compression).

In this example, the specimen is under tension (shown as two hollow arrows) in its major strain direction (i.e., the vertical direction in the loading path diagram 300). The characteristic length $l_g$ 412 is the original dimension of a strain gauge 410 or a finite element representing the strain gauge 410 used for measurement of strain values.

The metal is stretched by additional length to the deformed length $l_1$ 414 at the ultimate strength point right before the necking stage. Also shown in FIG. 4 is the neck width w 404, which is obtained/measured. At this point, the metal experiences the critical strain $\varepsilon_c$. The metal is further stretched to the final length $l_1+dw$ 416 before fracture occurs, and the neck width is increased to a final width w+dw 406.

Figure 5:
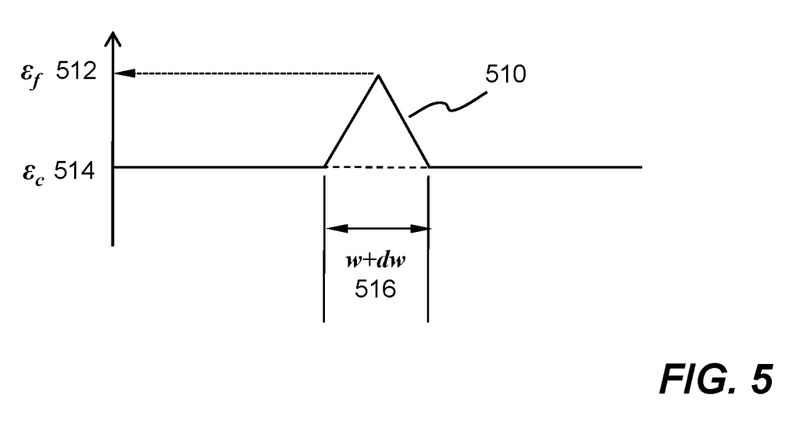
FIG. 5 is a diagram showing an example profile of strain distribution between critical strain and fracture strain in accordance with an embodiment of the invention.

FIG. 5 is a diagram showing a first example (triangular) profile 510 of strain distribution between critical strain value $\varepsilon_c$ 514 corresponding to the ultimate strength of the metal and peak fracture strain value $\varepsilon_f$ 512 corresponding to the metal stretched right before the fracture in accordance with an embodiment of the invention. The final width w+dw 516 at the base of the profile 510 is the length of the neck before facture occurs. The area of the triangular profile 510 is $(w+dw)*(\varepsilon_f-\varepsilon_c)/2$.

Obtained from the specimen test (either physical or numerically-simulated), the average fracture strain value $\varepsilon_M$ is an average strain value over the characteristic length $l_g$ for measurement. $\varepsilon_M$ can be expressed as follows:

$$\varepsilon_c = \ln\frac{l_1}{l_g} \quad (1)$$

$$l_1 = l_g e^{\varepsilon_c} \quad (2)$$

$$\ln\frac{dw}{w} = \frac{\varepsilon_f - \varepsilon_c}{2} \quad (3)$$

$$dw = we^{(\varepsilon_f-\varepsilon_c)/2} \quad (4)$$

$$\varepsilon_M = \ln\frac{l_1 + dw}{l_g} \quad (5)$$

$$\varepsilon_M = \ln\left[e^{\varepsilon_c} + \frac{w}{l_g}e^{(\varepsilon_f-\varepsilon_c)/2}\right] \quad (6)$$

In order to calculate the peak fracture strain value $\varepsilon_f$ from the measured data (i.e., $l_g$, w, $\varepsilon_M$, $\varepsilon_c$), a formula based on the first example profile is determined as follows:

$$\varepsilon_f = \varepsilon_c + 2\ln\left[\frac{l_g}{w}(e^{\varepsilon_M} - e^{\varepsilon_c})\right] \quad (7)$$

Figure 6:
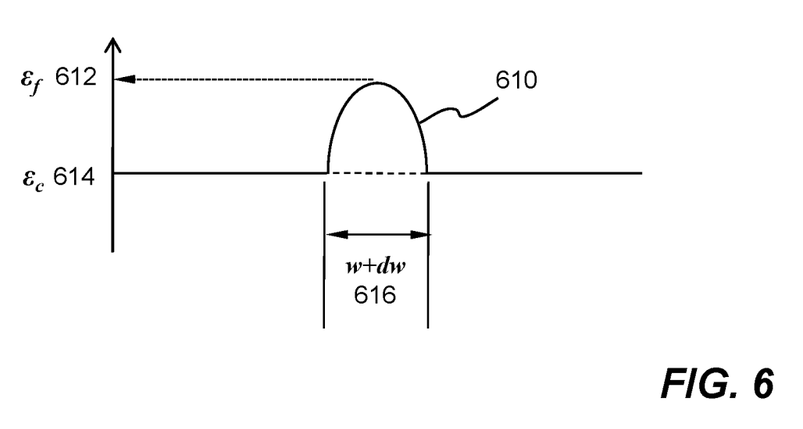
FIG. 6 is a diagram showing an alternative example profile of strain distribution between critical strain and fracture strain in accordance with an embodiment of the invention.

In an alternative embodiment, a second example (curved) profile 610 of strain values is shown in FIG. 6. The curved profile 610 has a peak representing the peak fracture strain value $\varepsilon_f$ 612 while the base representing the critical strain value $\varepsilon_c$ 614. The length at the base is the final width w+dw 616 of the neck before fracture. The area under the curved profile needs to be calculated to determine a different formula for deriving the peak facture strain values from the measured data.

Referring back to process 100, at action 104, numerically-calculated structural behaviors of the product/part are obtained by conducting a time-marching numerical simulation of a deep drawing metal forming process for manufacturing a product/part using the FEA model with the FEA application module. The time-marching simulation contains a number of solution cycles or time steps.

At each solution cycle, each integration point of each finite elements of the FEA model, respective peak fracture strain values for various loading conditions are calculated using the relevant formula. For a triangular shaped profile of strain distribution, equation (7) is used.

Figure 7:
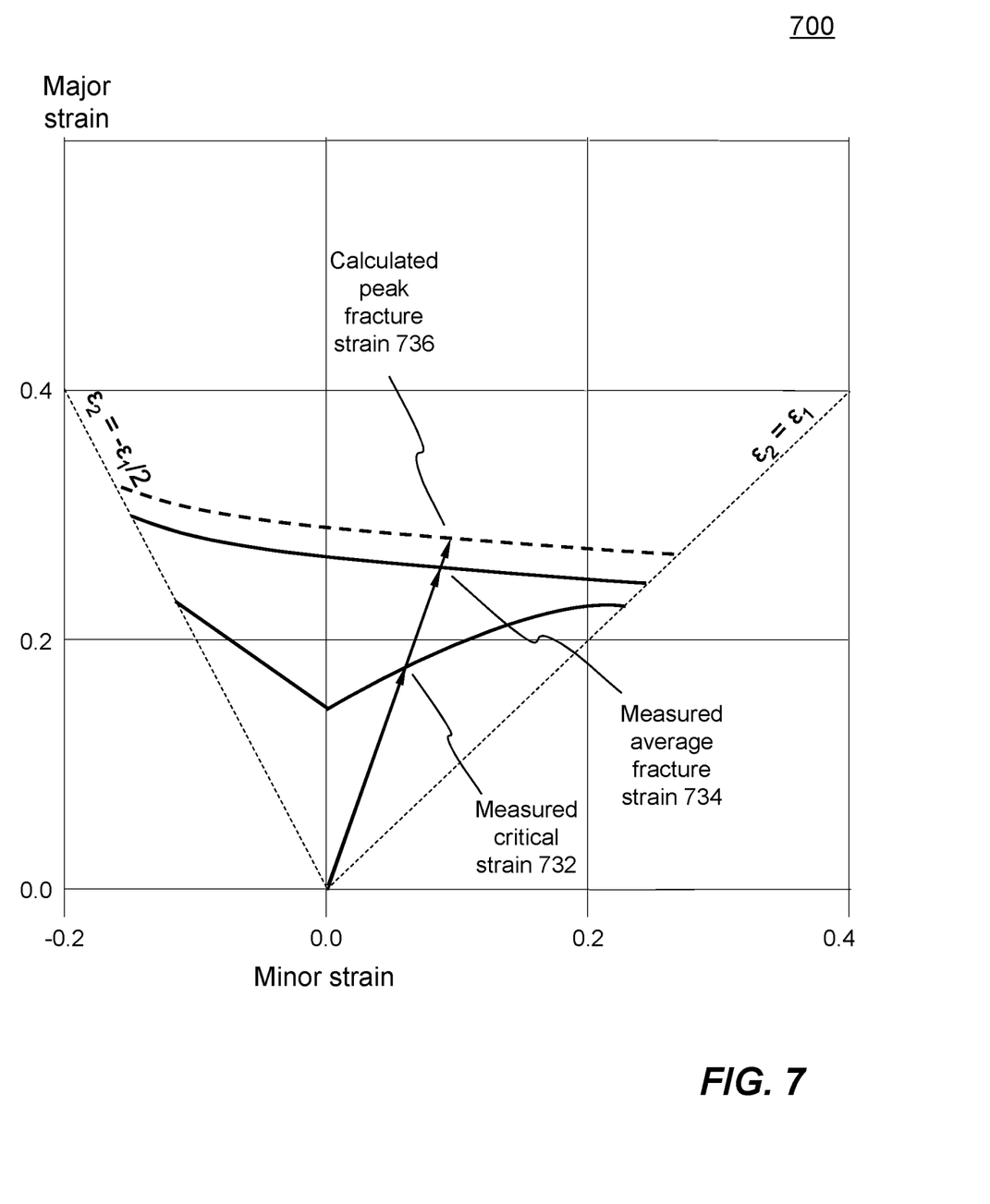
FIG. 7 is a diagram showing derived peak fracture strain values along with measured data in the loading path diagram in accordance with one embodiment of the invention.

FIG. 7 a diagram showing derived peak fracture strain values along with measured data in the loading path diagram in accordance with one embodiment of the invention. For any loading condition (shown as a line with triple arrows) between bi-axial tension ($\varepsilon_2=\varepsilon_1$) and uni-tension ($\varepsilon_2=-\varepsilon_1/2$) conditions, peak fracture strain 736 can be calculated/derived from the measured data including average fracture strain 734 and measured critical strain 732. The peak fracture strain values 736 are used in numerically-calculated structural behaviors of the product/part. The numerically-calculated structural behaviors include failure of the metal based on the peak fracture strain value under a particular loading condition. Then the product/part is manufactured in a deep drawing metal forming process based on the numerically-calculated structural behaviors obtained in the time-marching simulation.

Figure 8:
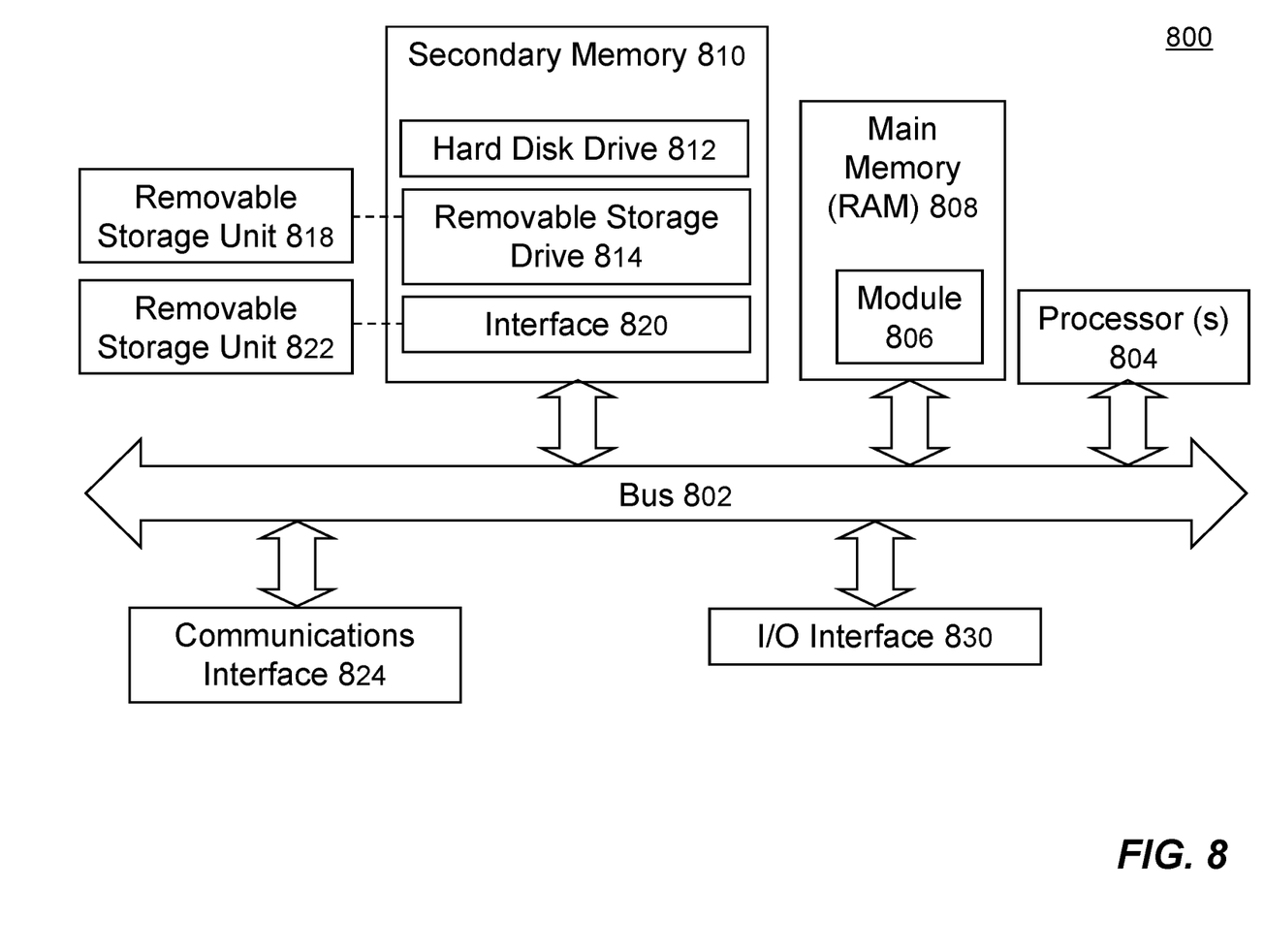
FIG. 8 is a functional block diagram showing salient components of an exemplary computer, in which an embodiment of the invention may be implemented.

According to one aspect, the invention is directed towards one or more computer systems capable of carrying out the functionality described herein. An example of a computer system 800 is shown in FIG. 8. The computer system 800 includes one or more processors, such as processor 804. The processor 804 is connected to a computer system internal communication bus 802. Various software embodiments are described in terms of this exemplary computer system. After reading this description, it will become apparent to a person skilled in the relevant art(s) how to implement the invention using other computer systems and/or computer architectures.

Computer system 800 also includes a main memory 808, preferably random access memory (RAM), and may also include a secondary memory 810. The secondary memory 810 may include, for example, one or more hard disk drives 812 and/or one or more removable storage drives 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 822 and interfaces 820 which allow software and data to be transferred from the removable storage unit 822 to computer system 800. In general, Computer system 800 is controlled and coordinated by operating system (OS) software, which performs tasks such as process scheduling, memory management, networking and I/O services.

There may also be a communications interface 824 connecting to the bus 802. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. The computer 800 communicates with other computing devices over a data network based on a special set of rules (i.e., a protocol). One of the common protocols is TCP/IP (Transmission Control Protocol/Internet Protocol) commonly used in the Internet. In general, the communication interface 824 manages the assembling of a data file into smaller packets that are transmitted over the data network or reassembles received packets into the original data file. In addition, the communication interface 824 handles the address part of each packet so that it gets to the right destination or intercepts packets destined for the computer 800. In this document, the terms "computer program medium" and "computer usable medium" are used to generally refer to media such as removable storage drive 814, and/or a hard disk installed in hard disk drive 812. These computer program products are means for providing software to computer system 800. The invention is directed to such computer program products.

The computer system 800 may also include an input/output (I/O) interface 830, which provides the computer system 800 to access monitor, keyboard, mouse, printer, scanner, plotter, and alike.

Computer programs (also called computer control logic) are stored as application modules 806 in main memory 808 and/or secondary memory 810. Computer programs may also be received via communications interface 824. Such computer programs, when executed, enable the computer system 800 to perform the features of the invention as discussed herein. In particular, the computer programs, when executed, enable the processor 804 to perform features of the invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. The application module 806, when executed by the processor 804, causes the processor 804 to perform the functions of the invention as described herein.

The main memory 808 may be loaded with one or more application modules 806 that can be executed by one or more processors 804 with or without a user input through the I/O interface 830 to achieve desired tasks. In operation, when at least one processor 804 executes one of the application modules 806, the results are computed and stored in the secondary memory 810 (i.e., hard disk drive 812). The status of the calculations of peak fracture strain values is reported to the user via the I/O interface 830 either in a text or in a graphical representation.

Although the invention has been described with reference to specific embodiments thereof, these embodiments are merely illustrative, and not restrictive of, the invention. Various modifications or changes to the specifically disclosed exemplary embodiments will be suggested to persons skilled in the art. For example, whereas two-dimensional finite elements have been shown and described for the invention, other types of finite elements may be used to achieve the same, for example, one-dimensional finite element (beam element) or three-dimensional finite element (solid element). Generally, there is one major strain value and two minor strain values in a three-dimensional finite element. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of using results in a simulation for manufacturing a product or part comprising:
   receiving, in a computer system having a finite element analysis (FEA) application module installed thereon, a FEA model representing a product or part made at least in part of metal, a set of metal fracture failure criteria in form of a loading path diagram, a measurement characteristic length in a specimen test of the metal, and characteristics of a neck formed in the metal, the FEA model containing at least a plurality of finite elements that represents the product's metal portion, the metal fracture failure criteria containing respective measured critical strain value and average fracture strain value in various loading conditions, the characteristics of the neck including the neck's width and a profile of strain distribution within the neck's width, wherein the average fracture strain value is based on the measurement characteristic length;
   obtaining, with the FEA application module, numerically-calculated structural behaviors of the product by conducting a simulation of a deep drawing metal forming process using the FEA model by calculating respective peak fracture strain values for each of the loading conditions using a formula based on the profile of strain distribution within the neck's width, the neck's width, the measured critical strain value and the average fracture strain value; and
   manufacturing the product in the deep drawing metal forming process based on the numerically-calculated structural behaviors according to the measured critical strain value and the average fracture strain value obtained in the simulation.

2. The method of claim 1, wherein the measured critical strain value and the average fracture strain value are between uni-tension and biaxial tension conditions.

3. The method of claim 1, wherein said specimen test of metal comprises a physical specimen test and the measurement characteristic length is a strain gauge's length.

4. The method of claim 1, wherein said specimen test of metal comprises a numerically-simulated specimen test and the measurement characteristic length is a finite element's dimension that represents a strain gauge.

5. The method of claim 1, wherein said profile comprises a triangular profile.

6. The method of claim 5, wherein said formula is as follows:

$$\varepsilon_f = \varepsilon_c + 2\ln\left[\frac{l_g}{w}(e^{\varepsilon_M} - e^{\varepsilon_c})\right]$$

where:
w is the neck's width,
$l_g$ the measurement characteristic length,
$\varepsilon_M$ is the average fracture strain value,
$\varepsilon_c$ is the measured critical strain value, and
$\varepsilon_f$ is the peak fracture strain value.

7. The method of claim 6, wherein the structural behaviors include necking and fracture failure of the metal based on the peak fracture strain value under a particular loading condition.

8. The method of claim 1, wherein said profile comprises one or more curves.

9. A system for using results in a simulation for manufacturing a product or part comprising:
   a memory for storing computer readable code for a FEA application module;
   at least one processor coupled to the memory, said at least one processor executing the computer readable code in the memory to cause the FEA application module to perform operations of:
   receiving a FEA model representing a product or part made at least in part of metal, a set of metal fracture failure criteria in form of a loading path diagram, a measurement characteristic length in a specimen test of the metal, and characteristics of a neck formed in the metal, the FEA model containing at least a plurality of finite elements that represents the product's metal portion, the metal fracture failure criteria containing respective measured critical strain value and average fracture strain value in various loading conditions, the characteristics of the neck including the neck's width and a profile of strain distribution within the neck's width, wherein the average fracture strain value is based on the measurement characteristic length;

obtaining numerically-calculated structural behaviors of the product by conducting a simulation of a deep drawing metal forming process using the FEA model by calculating respective peak fracture strain values for each of the loading conditions using a formula based on the profile of strain distribution within the neck's width, the neck's width, the measured critical strain value and the average fracture strain value; and whereby the product is manufactured in the deep drawing metal forming process based on the numerically-calculated structural behaviors according to the measured critical strain value and the average fracture strain value obtained in the simulation.

10. The system of claim 9, wherein the measured critical strain value and the average fracture strain value are between uni-tension and biaxial tension conditions.

11. The system of claim 9, wherein said specimen test of metal comprises a physical specimen test and the measurement characteristic length is a strain gauge's length.

12. The system of claim 9, wherein said specimen test of metal comprises a numerically-simulated specimen test and the measurement characteristic length is a finite element's dimension that represents a strain gauge.

13. The system of claim 9, wherein said profile comprises a triangular profile.

14. The system of claim 13, wherein said formula is as follows:

$$\varepsilon_f = \varepsilon_c + 2\ln\left[\frac{l_g}{w}(e^{\varepsilon_M} - e^{\varepsilon_c})\right]$$

where:
w is the neck's width,
$l_g$ the measurement characteristic length,
$\varepsilon_M$ is the average fracture strain value,
$\varepsilon_c$ is the measured critical strain value, and
$\varepsilon_f$ is the peak fracture strain value.

15. The system of claim 14, wherein the structural behaviors include necking and fracture failure of the metal based on the peak fracture strain value under a particular loading condition.

16. A non-transitory computer readable storage medium containing computer instructions for using results in a simulation for manufacturing a product or part, said computer instructions when executed on a computer system cause the computer system to perform operations of:

receiving, in a computer system having a finite element analysis (FEA) application module installed thereon, a FEA model representing a product or part made at least in part of metal, a set of metal fracture failure criteria in form of a loading path diagram, a measurement characteristic length in a specimen test of the metal, and characteristics of a neck formed in the metal, the FEA model containing at least a plurality of finite elements that represents the product's metal portion, the metal fracture failure criteria containing respective measured critical strain value and average fracture strain value in various loading conditions, the characteristics of the neck including the neck's width and a profile of strain distribution within the neck's width, wherein the average fracture strain value is based on the measurement characteristic length;

obtaining, with the FEA application module, numerically-calculated structural behaviors of the product by conducting a simulation of a deep drawing metal forming process using the FEA model by calculating respective peak fracture strain values for each of the loading conditions using a formula based on the profile of strain distribution within the neck's width, the neck's width, the measured critical strain value and the average fracture strain value; and whereby the product is manufactured in the deep drawing metal forming process based on the numerically-calculated structural behaviors according to the measured critical strain value and the average fracture strain value obtained in the simulation.

17. The non-transitory computer readable storage medium of claim 16, wherein the measured critical strain value and the average fracture strain value are between uni-tension and biaxial tension conditions.

18. The non-transitory computer readable storage medium of claim 16, wherein said specimen test of metal comprises a physical specimen test and the measurement characteristic length is a strain gauge's length.

19. The non-transitory computer readable storage medium of claim 16, said specimen test of metal comprises a numerically-simulated specimen test and the measurement characteristic length is a finite element's dimension that represents a strain gauge.

20. The non-transitory computer readable storage medium of claim 16, wherein said profile comprises a triangular profile and wherein said formula is as follows:

$$\varepsilon_f = \varepsilon_c + 2\ln\left[\frac{l_g}{w}(e^{\varepsilon_M} - e^{\varepsilon_c})\right]$$

where:
w is the neck's width,
$l_g$ the measurement characteristic length,
$\varepsilon_M$ is the average fracture strain value,
$\varepsilon_c$ is the measured critical strain value, and
$\varepsilon_f$ is the peak fracture strain value.

* * * * *